Aug. 24, 1937.     M. COHEN     2,091,066
BAKING CONTAINER
Filed Dec. 9, 1935
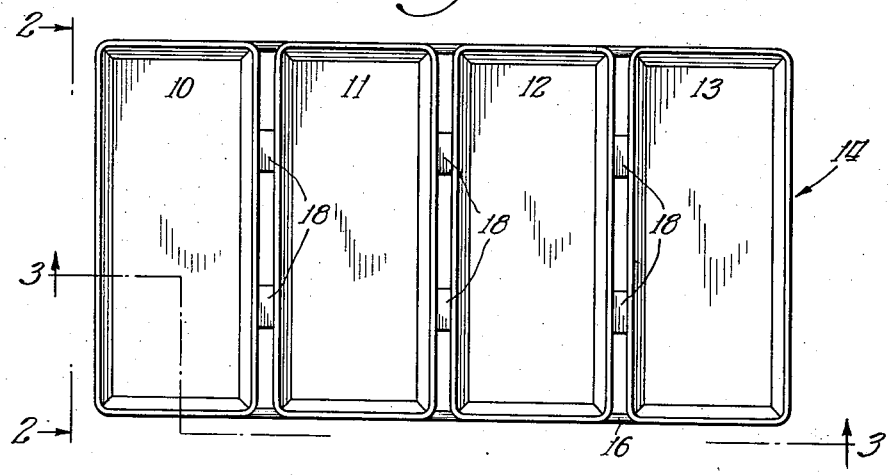
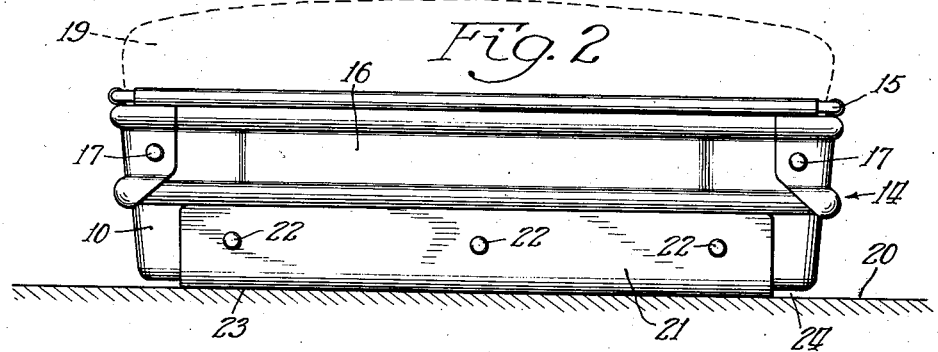
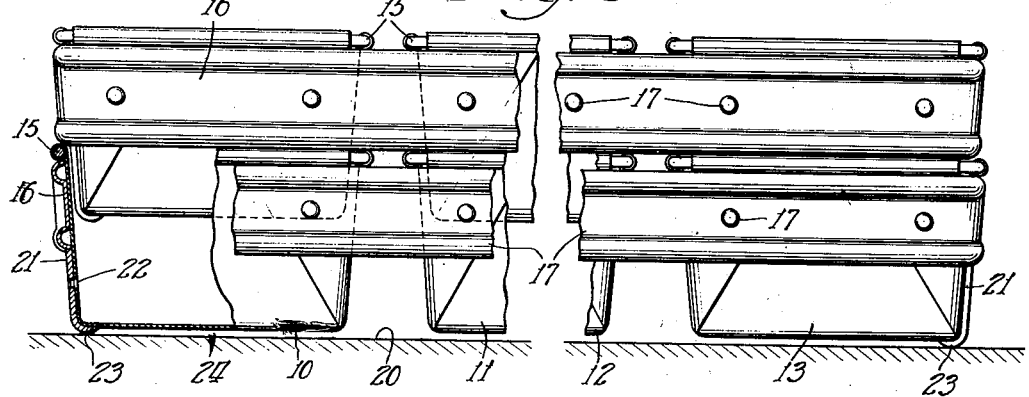
Inventor:
Morris Cohen
By: A. Trevor Jones  Atty.

Patented Aug. 24, 1937

2,091,066

UNITED STATES PATENT OFFICE 2,091,066

BAKING CONTAINER

Morris Cohen, Kansas City, Mo., assignor to Schulze Baking Company, Kansas City, Mo., a corporation of Illinois Application December 9, 1935, Serial No. 53,447

2 Claims. (Cl. 53—6)

This invention relates to bread baking containers or the like more particularly comprising a plurality of pans, into each of which is placed a separate lump of dough to be baked in an oven or the like to produce a plurality of separate loaves of bread, the pans however being secured together rigidly in a row of say three, four or five pans generally abreast.

For economy these pans are usually made of relatively light tin material which tends to wear rapidly as the containers are slid over the hearth of an oven to be placed therein for baking of the bread and then removed after baking. Also, as these containers are now constructed and used, the bottoms of the light metal pans rest directly upon the hearth of the oven and the direct contact with the hearth along the bottoms of the pans not only enhances the destruction of the pans but also causes the bottoms of the loaves to become burned or at least undesirably more browned than the rest of the loaf. This latter condition is aggravated by the wear on the bottom of the pans which thins the metal of the pans at this point. Also, parts of the pan bottoms tend to warp or bend out of shape, so that some parts touch the hearth while others do not, causing burned or overbrowned spots on the bottoms of the loaves due to unequal heat transfer between hearth and dough over adjacent areas of the bottoms of the loaves.

My invention aims to provide means which reinforces the container at these points of greatest wear, while at the same time minimizing the wear by acting as a supporting runner upon which the container rests with a minimum of contact points between the container and the hearth of the oven, and which at the same time elevates the pans slightly above the hearth so that there is no wear upon the pans themselves and also so that an air space is provided between the bottoms of the pans and the hearth which prevents the undesirable browning or burning of the bottoms of the loaves, while at the same time permitting nesting of the containers, with individual pans of one container telescopically received in the individual pans of another container. Other objects and advantages will be apparent from the following description taken together with the accompanying drawing showing an illustrative embodiment of my invention, in which—

Figure 1 is a conventional plan view of a bread baking container to which I have referred and with which my improvement may be associated;

Figure 2 is an end view of the container of Fig. 1, showing my invention applied thereto and showing, diagrammatically, as by a broken line, the use of the container for a loaf of bread or the like; and Figure 3 is a side elevational view, partly in section as along the broken line 3—3 of Fig. 1, of a plurality of the containers shown in Figs. 1 and 2, in internested relation.

Referring in detail to the figures of the drawing, in the illustrative construction shown herein, a plurality, in this instance, four bread pans, 10, 11, 12 and 13, are conventionally secured together side by side to make up jointly the container indicated generally by the numeral 14. The bread pans are formed of the usual light tin material, which, in a conventional manner, may be reinforced about their upper edges by the wires 15 about which the tin of the pans is curled, and the four pans, in this case, are conventionally secured together by the metallic strap 16 encircling the perimeter of the composite container and riveted to the pans as at 17, spaced above the bottoms of the pans. Also in the usual manner, clips 18 engage the rolled-over edges of adjacent pans at suitable intervals and further secure them together.

The container 14 as a whole, when each of the pans has received a lump of dough therein, and after the dough has been proofed or allowed to rise, to form a loaf somewhat as indicated at 19, is inserted into the usual baking oven to be received on the hot hearth 20 of the oven. In accordance with my invention, the container is supported on the hearth through the intermediation of the end plates or other elevating means 21 one of which is secured to the outer side of each of the end pans, in this instance the pans 10 and 13, as by rivets 22.

As best shown in Fig. 3, the plates 21 are of heavier material than the material of the pans and are turned or curled as at 23 about the lower outer edges of the end pans. Thus an air space 24 is obtained between the bottoms of the pans and the hearth 20, which prevents the bottoms of the pans from becoming excessively heated as compared with the remainder of the container, and which likewise effects uniformity of baking of the loaf bottom.

Furthermore, the curled portions 23 of the plates 21 provide, in effect, runners which support the container on the hearth and thereby take the wear which would otherwise be incurred by the bottoms of the pans. Also these curled portions, by the slight radius which they assume, as well as by the elimination of sharp edges, reduce the points of contact and therefore the friction between the container and the hearth, minimizing the effort required to slide the containers in and out of the oven. This also desirably reduces the time required to arrange the containers within the oven. The portions 23 are large enough and desirably of rounded contour to avoid catching in the openings between the slats of a modern oven conveyor.

Furthermore, my improved reinforcing and elevating plate 21 protects the ends of the containers against blows which may be incurred as the containers are slid in and out of the oven.

When the containers are empty, it is desirable that they shall be capable of being stacked together or nested to occupy a minimum of space and to accomplish this it has been customary to taper the pans toward their bottoms so that the pans themselves and consequently the composite containers may be internested as shown in Fig. 3. My improved plate 21, since it terminates short of the ends of the pans and in fact falls entirely within the perpendicular projection of the greatest over-all dimensions of the pans, offers no interference with this customary internesting. Since the pans are not tied together at any point below the strap 17, the containers may internest to the extent of abutment of the strap 17 on one container with the tops of the pans of another container, the individual pans being telescopically received in the pans of the other container.

The invention is not limited to the details of construction shown and described.

Having described my invention, I claim:

1. As an article of manufacture, a bread baking container embodying a plurality of metal pans, each for an individual loaf of bread secured together side by side in a row, a plate of substantially heavier metal than the pans secured to the end pans only of a row and turned to a material extent about an outer lower corner of the end pan, said plate terminating short of the ends of the pans and providing a runner upon which the container may be slid over the floor of a hearth while elevating the container slightly above the hearth to afford an air space therebetween and permitting nesting of the containers.

2. As an article of manufacture, bread container means embodying a plurality of pans decreasingly tapered toward their bottoms, means carried by the pans and spaced substantially above their bottoms for tying the pans together, and means at the bottoms of at least two of the pans but discontinued between the pans for spacing the container as a whole above the surface of a hearth or the like, said spacing means being of rounded contour merging into the pan bottom to avoid a sharp edge and being of reduced dimensions whereby one container may be nested in another similar container to the extent substantially of abutment of the tying means with the tops of the pans of the other container, the lower part of each pan of one container below said tying means being telescopically received within another pan of another container nested therewith.

MORRIS COHEN.